UNITED STATES PATENT OFFICE.

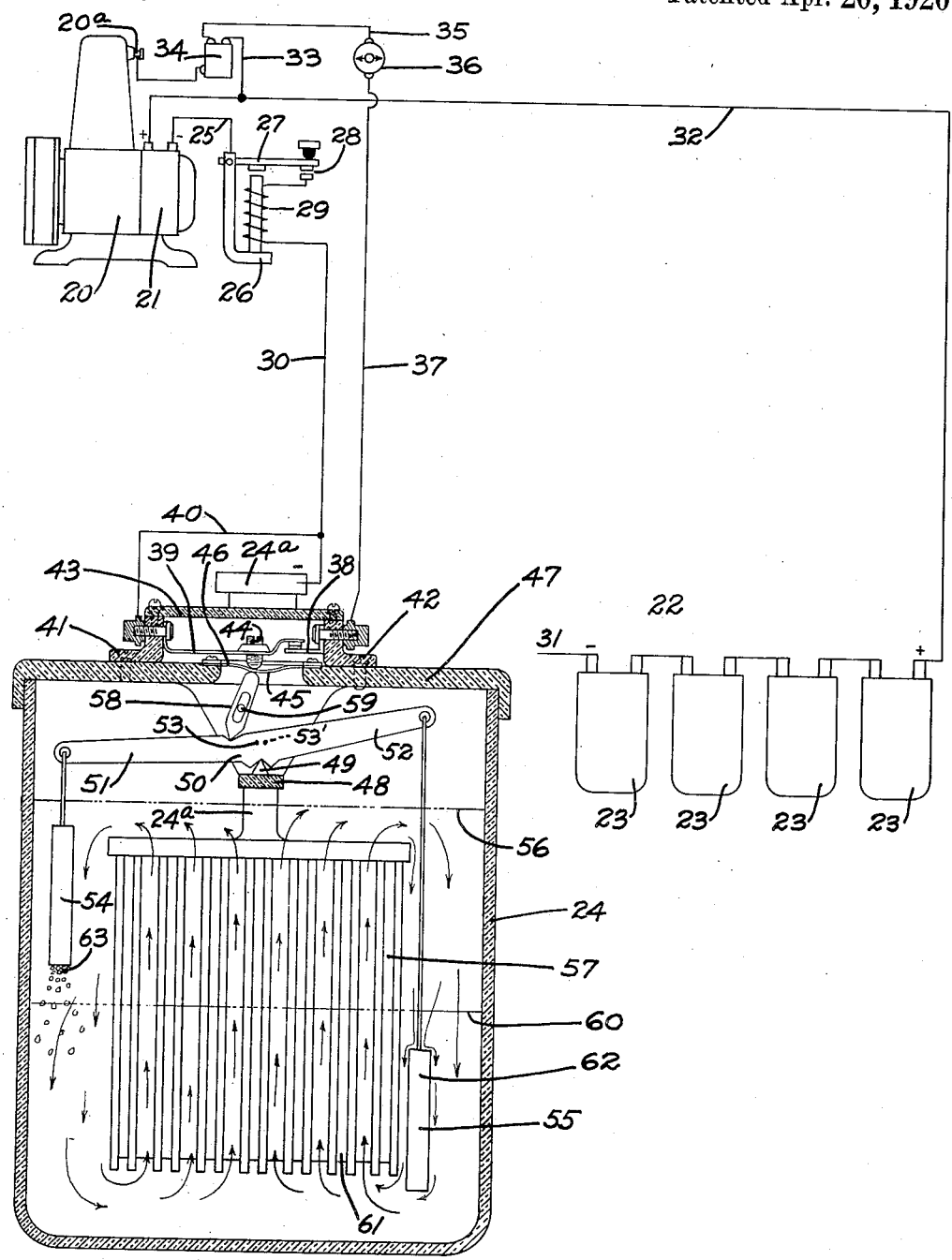
T. MIDGLEY, Jr.
CIRCUIT BREAKER.
APPLICATION FILED FEB. 15, 1918.
1,337,366.
Patented Apr. 20, 1920.

THOMAS MIDGLEY, JR., OF DAYTON, OHIO, ASSIGNOR, BY MESNE ASSIGNMENTS, TO THE DELCO-LIGHT COMPANY, OF DAYTON, OHIO, A CORPORATION OF OHIO.

CIRCUIT-BREAKER.

1,337,366.  Specification of Letters Patent.  Patented Apr. 20, 1920.

Application filed February 15, 1918. Serial No. 217,359.

*To all whom it may concern:*

Be it known that I, THOMAS MIDGLEY, Jr., a citizen of the United States of America, residing at Dayton, county of Montgomery, State of Ohio, have invented certain new and useful Improvements in Circuit-Breakers, of which the following is a full, clear, and exact description.

This invention relates to a circuit breaker and has for one of its objects the provision of a circuit breaker which is controlled by a hydrostat, or a movable device, the movements of which are controlled by the condition of the electrolyte of a storage battery.

Other and further objects of the present invention will be apparent from the following description of an embodiment thereof reference being had to the accompanying drawing.

The figure of the drawing shows a sectional view of a storage cell to which the present invention is applied, and a wiring diagram of a charging circuit including the said storage cell.

Referring to the drawing, 20 designates an internal combustion engine driving a generator 21 for charging a storage battery composed of cells 23 and 24. The charging circuit comprises wire 25 leading from one terminal of the generator, starting switch 26 including armature 27, switch contacts 28 and holding coil 29, wire 30 leading to terminals 24ª of the battery 24. The charging circuit continues through wire 31 leading from the positive terminal of battery 24 (not shown), through storage cells 23, and through wire 32 back to the generator. The ignition circuit for the engine includes wire 33 leading out from wire 32, ignition coil 34, wire 35, ignition timer 36, wire 37, contact members 38 and 39 of the hydrostat controlled circuit breaker, thence through wire 40 to wire 30 of the charging circuit. The proper connection is made between the ignition coil 34 and spark plug 20ª of engine 20.

The circuit breaker members 38 and 39 are mounted in an inclosure 41 of insulating material, such as bakelite, which will resist the acid fumes of the storage battery. The inclosure 41 is mounted upon cover 47 of battery 24 by means of screws 42. Cover 47 is made of rubber or bakelite or other similar material. Inclosure 42 is provided with a cover 43 suitably secured thereon, which may be removed to permit access to the contact members, and especially for adjusting the screw 44 mounted upon element 39. The cover 47 is provided with an aperture which is closed by a rubber diaphragm 45, secured in place upon said cover by means of binding element 46. From the foregoing description it is apparent that the contact members of the circuit breaker are inclosed in an inclosure which will protect said elements from contact with any acid laden vapors arising from the electrolyte of the cell, or with the outside atmosphere which is generally charged with moisture, which would be injurious to the circuit breaker elements. The cover 47 supports a shelf 48 carrying a fulcrum 49. Upon fulcrum 49 is balanced a differentially balanced beam 50, having arm 51 slightly longer than arm 52 for a purpose to be described, the shape of said beam being such that its center of gravity 53 lies above the fulcrum 49. Displacement members 54 and 55 are suspended from beam arms 51 and 52, respectively, and on opposite sides of the storage battery plates 57, the member 54 being suspended near the upper level 56 of the electrolyte, and the member 55 near the bottom of the cell. Member 58, sliding on pin 59 carried by cover 49, coöperates as a toggle member with the beam 50 and serves to transmit motion, imparted to beam 50 in a manner to be described, through diaphragm 45 to screw 44 carried by member 39. The beam 50 being in the position shown, screw 44 is adjusted so just to press diaphragm 45 against member 58, but not sufficiently to cause movement of beam 50 or member 39.

The operation of the device is as follows:

Assuming the engine 20 to be at rest, and the battery 22 to carry an electrical charge, the engine is started by depressing armature 27 of starting switch 26 which causes the current from the battery to flow through the battery charging circuit already described. The generator 21 will operate as a motor until the engine has become self actuating, after which said member 21 will be operated as a generator to charge the battery. By virtue of current flowing through the holding coil 29 of starting switch 26, the contacts 28 will be maintained in a closed position.

I have discovered that while the battery is being charged that the density of the electrolyte is not uniform throughout, but ranges from a lower value at the top of the electrolyte to a higher value at the bottom. While there is no abrupt change in the degree of density of the electrolyte at different levels, for sake of convenience, the imaginary line 60 designates a division between the upper layers of electrolyte of lower density and the layers of electrolyte of higher density in the cell 24. The phenomenon described will be referred to as stratification. While the battery is being charged, the beam 50 occupies the position shown in the drawing, for, since the displacement members 54 and 55 are made the same in weight and volume, the lifting force exerted by the electrolyte of higher density upon displacement member 55 will be greater than the lifting force by the electrolyte of lower density upon displacement member 54. Also the fact that arm 51 of beam 50 is slightly longer than 52 will aid to some extent maintaining the beam in the position shown. I have discovered that just before the battery is fully charged that there is an inversion of the stratification referred to, in which the electrolyte of higher density will rise to the upper level and cause the electrolyte of lower density to be displaced and to move to the bottom of the cell. This phenomenon may be caused by the pumping action taking place between the plates 57 or storage cell due to the rapid formation of gas bubbles which pass upwardly and cause a circulation of the electrolyte to be set up as indicated by the arrows shown in the drawing. Due to the inversion of stratification the lifting force exerted by the electrolyte on member 54 will be greater than upon member 55. I have also observed that the current set up in the electrolyte at the time of inversion of stratification, attains considerable velocity. By reason of the location of displacement member 55 near the bottom of the cell, the descending current of the electrolyte will impinge on the top surface of said member 55 as indicated by the arrows. Displacement member 54 will not be thus affected since the top surface of said member is located near the level 56 of the electrolyte. I have observed also that the gas bubbles formed during the gassing period which pass upwardly through the electrolyte at either side of the plates 57 will collect upon the lower surface of displacement member 54 as shown at 63; and that the collection of bubbles will not occur to any appreciable extent upon the lower surface of displacement member 55, since said lower surface is located below the lower edges of plates 57. I have further observed that during the inversion of stratification that the temperature of the electrolyte above line 60 is greater than below line 60. This increase of temperature will cause the volume of member 54 to become greater than that of member 55.

It is apparent therefore that a number of factors enter into the change in the position of beam 50, among which the following are noted: First, the increased lifting force upon displacement member 54 and a decrease in lifting force upon member 55 due directly to inversion of stratification; second, the excess in downward pressure upon the upper surface of member 55 over the pressure upon upper surface of 54, due to impinging of currents of electrolyte upon member 55; third, the excess in lifting force upon 54 over that upon 55 due to the collection of gas bubbles upon the lower surface of member 54; and fourth, the excess in lifting force upon member 54 over member 55 due to the increase in volume of member 54 caused by increase in temperature of the electrolyte above the temperature of electrolyte surrounding member 55. The combination of these factors mentioned, and possibly others, produces an excess in the lifting force exerted upon member 54 over that upon member 55, which is sufficient to cause the upward movement of arm 51 of beam 50, resulting in the beam coming to rest with the center of gravity 53 of said beam now at point 53' on the opposite side of a vertical line passing through the center of suspension. Motion is transmitted from beam 50 through member 58 to circuit breaker member 39, causing the same to move upwardly and to effect an interruption of the ignition circuit, thus stopping the engine.

I have discovered that the inversion of stratification will not be maintained, but that in a short time after the phenomenon described has occurred, equilibrium will be reestablished and the electrolyte of higher density will return to the lower level of the cell. When this occurs, the forces acting upwardly on arm 52 of beam 50 will exceed the upward forces on arm 51. This together with the fact of arm 51 being slightly longer than arm 52 will produce a restoration of the beam to its original position, resulting in the closing of the ignition circuit.

While the present invention has been shown and described in connection with the ignition circuit of an engine operating a battery charging generator, it is to be understood that the application of the present invention is not thus limited, but that other applications may be made with the purpose of controlling other elements of a battery charging system.

While the device shown and described constitutes a preferred embodiment of the present invention, it is to be understood that other forms may be adopted, all come within the scope of the claims which follow:

1. In a hydrostat controlled circuit breaker, the combination with contact elements; of a beam pivoted at an intermediate point; and displacement members suspended by the beam in the electrolyte of a storage cell.

2. In a hydrostat controlled circuit breaker, the combination with contact elements; of a beam; displacement members suspended by the beam at different levels in the electrolyte of a storage battery; and means coöperating with the beam and the contact elements.

3. In a hydrostat controlled circuit breaker, the combination with contact elements; of a differentially balanced beam pivoted at an intermediate point thereof; displacement members suspended one from each end of the beam and located within the electrolyte of a storage battery and on opposite sides of the storage battery plates; and means coöperating with the beam and the contact elements.

4. In a hydrostat controlled circuit breaker, the combination with contact elements; of a differential balanced beam pivoted at an intermediate point thereof; displacement members suspended by the beam and within the electrolyte of storage battery and on opposite sides of the storage battery plates, one at a level near the top of the cell and the other near the bottom of the cell; and means coöperating with the beam and the contact elements.

5. In a hydrostat controlled circuit breaker, the combination with contact elements; of displacement members suspended within the electrolyte of a storage battery; and means for suspending said members in such a manner that the inversion of stratification of the electrolyte will cause a change in position of the suspending means, and means coöperating between the suspending means and contact elements.

6. In a hydrostat controlled circuit breaker, the combination with an inclosure of material impervious to cell fumes; a flexible wall for the inclosure; a hydrostat located within the electrolyte of a storage battery and adapted to impart motion of the flexible wall; and contact elements in the inclosure adapted to be actuated by the movement of the flexible wall.

7. In a hydrostat controlled circuit breaker, the combination with a storage cell; of a cell cover provided with a shelf on which is mounted a fulcrum; a differentially balanced beam pivoted on the fulcrum; displacement members suspended one at each end of the beam and at opposite side of the storage battery plates, one at a high level, and the other at a lower level in the electrolyte; an aperture in the cover; a rubber diaphragm covering the aperture; an inclosure mounted on cell cover; circuit breaker contact elements mounted in the inclosure; a screw member carried by one of the contact elements, and adapted to be adjusted to contact with the upper side of the diaphragm; and a member coöperating with the beam, and with the under side of the diaphragm at a point opposite the screw member.

8. In a hydrostat circuit breaker, the combination with a hydrostat located within the electrolyte of a storage battery; of contact elements; and an inclosure for said elements constructed of material impervious to battery fumes and having provisions for transmitting motion from the hydrostat for separating the contacts.

9. In a hydrostat circuit breaker, the combination with coöperating contact elements including a movable element to be controlled; of a hydrostatic device adapted to be associated with the storage battery electrolyte and arranged to operate said movable element, the movement of said hydrostatic device being due to the difference in specific gravity of the upper level of the electrolyte and the lower level during inversion of stratification, and due to the pressure exerted by the circulation of the electrolyte.

10. In a hydrostat circuit breaker, the combination with coöperating contact elements including a movable element to be controlled; of a hydrostatic device adapted to be associated with the storage battery electrolyte and arranged to operate said movable element, the movement of said hydrostatic device being due to the difference in specific gravity of the upper level of the electrolyte and the lower level during inversion of stratification, and due to the lifting force of gas bubbles during the gassing of the battery.

11. In a hydrostat circuit breaker, the combination with coöperating contact elements including a movable element to be controlled; of a hydrostatic device adapted to be associated with the storage battery electrolyte and arranged to operate said movable element, the movement of said hydrostatic device being due to the difference in specific gravity of the upper level of the electrolyte and the lower level during inversion of stratification, and due to the difference of temperatures between the upper and lower levels of electrolyte during the inversion of stratification.

12. In a hydrostat circuit breaker, the combination with coöperating contact elements including a movable element to be controlled; of a hydrostatic device adapted to be associated with the storage battery electrolyte and arranged to operate said movable element, the movement of said hydrostatic device being due to the pressure exerted by the circulation of the electrolyte, and due to the lifting force of gas bubbles during the gassing of the battery.

13. In a hydrostat circuit breaker, the combination with coöperating contact elements including a movable element to be controlled; of a hydrostatic device adapted to be associated with the storage battery electrolyte and arranged to operate said movable element, the movement of said hydrostatic device being due to the pressure exerted by the circulation of the electrolyte, and due to the difference of temperature between the upper and lower levels of electrolyte during the inversion of stratification.

14. In a hydrostat circuit breaker, the combination with coöperating contact elements including a movable element to be controlled; of a hydrostatic device adapted to be associated with the storage battery electrolyte and arranged to operate said movable element, the movement of said hydrostatic device being due to the lifting force of gas bubbles during the gassing of the battery, and due to the difference of temperature between the upper and lower levels of electrolyte during the inversion of stratification.

15. In a hydrostat circuit breaker, the combination with coöperating contact elements including a movable element to be controlled; of a hydrostatic device adapted to be associated with the storage battery electrolyte and arranged to operate said movable element, the movement of said hydrostatic device being due to the pressure exerted by the circulation of the electrolyte, due to the lifting force of gas bubbles during the gassing of the battery, and due to the difference of temperature between the upper and lower levels of electrolyte during the inversion of stratification.

16. In a hydrostat circuit breaker, the combination with coöperating contact elements including a movable element to be controlled; of a hydrostatic device adapted to be associated with the storage battery electrolyte and arranged to operate said movable element, the movement of said hydrostatic device being due to the difference in specific gravity of the upper level of the electrolyte and the lower level during inversion of stratification, due to the pressure exerted by the circulation of the electrolyte, due to the lifting force of gas bubbles during the gassing of the battery, and due to the difference of temperature between the upper and lower levels of electrolyte during the inversion of stratification.

17. In a hydrostatic controlled circuit breaker, the combination with coöperating contact elements including a movable element of a hydrostatic device arranged to be associated with the storage battery electrolyte and arranged to operate said movable element, the movement of said hydrostatic device being due to the difference in specific gravity of the upper level of the electrolyte and the lower level during inversion of stratification.

18. In a hydrostat circuit breaker, the combination with coöperating contact elements including a movable element to be controlled; of a hydrostatic device adapted to be associated with the storage battery electrolyte and arranged to operate said movable element, the movement of said hydrostatic device being due to the pressure exerted by the circulation of the electrolyte.

19. In a hydrostat circuit breaker, the combination with coöperating contact elements including a movable element to be controlled; of a hydrostatic device adapted to be associated with the storage battery electrolyte and arranged to operate said movable element, the movement of said hydrostatic device being due to the lifting force of gas bubbles during the gassing of the battery.

20. In a hydrostat circuit breaker, the combination with coöperating contact elements including a movable element to be controlled; of a hydrostatic device adapted to be associated with the storage battery electrolyte and arranged to operate said movable element, the movement of said hydrostatic device being due to the difference of temperature between the upper and lower levels of electrolyte during the inversion of stratification.

21. In a hydrostatic controlled circuit breaker, the combination with coöperating contact elements including a movable element of a hydrostatic device arranged to be associated with the storage battery electrolyte, said device being constructed and arranged to control said movable element during the period of inversion of stratification, but to release said element when the inversion of stratification ceases.

In testimony whereof I affix my signature.

THOMAS MIDGLEY, Jr.

Witnesses:
 WALTER H. RIEDEL,
 IRVIN A. GREENWALD.

Certificate of Correction.

It is hereby certified that the assignee in Letters Patent No. 1,337,366, granted April 20, 1920, upon the application of Thomas Midgley, Jr., of Dayton, Ohio, for an improvement in "Circuit Breakers," was erroneously described and specified as "The Delco-Light Company, of Dayton, Ohio, a Corporation of Ohio," whereas said assignee should have been described and specified as *Delco-Light Company, of Dayton, Ohio, a Corporation of Delaware*, as shown by the records of assignments in this office; and that the said Letters Patent should be read with this correction therein that the same may conform to the record of the case in the Patent Office.

Signed and sealed this 9th day of May, A. D., 1922.

[SEAL.]

KARL FENNING,
*Acting Commissioner of Patents.*